United States Patent [19]

Kuribayashi et al.

[11] 4,299,757
[45] Nov. 10, 1981

[54] AROMATIC POLYETHER RESIN COMPOSITION

[75] Inventors: Isao Kuribayashi, Yokosuka; Jurou Ohzeki; Kiyoshi Shimamura, both of Yokohama, all of Japan

[73] Assignee: Asahi-Dow Limited, Tokyo, Japan

[21] Appl. No.: 143,860

[22] Filed: Apr. 25, 1980

[30] Foreign Application Priority Data

May 1, 1979 [JP] Japan .................................. 54-52467

[51] Int. Cl.$^3$ .................... C08K 7/14; C08L 51/06; C08L 71/04
[52] U.S. Cl. ........................ 260/42.18; 260/45.7 P; 260/45.7 PH; 260/45.85 B; 260/45.85 S; 260/45.95 F; 525/68
[58] Field of Search .......... 525/68; 260/42.18, 45.7 P, 260/45.7 PH, 45.85 B, 45.85 S, 45.95 F

[56] References Cited

U.S. PATENT DOCUMENTS

| | | | |
|---|---|---|---|
| 3,361,851 | 1/1968 | Gowan | 525/68 |
| 3,383,435 | 5/1968 | Cozek | 525/68 |
| 4,143,095 | 3/1979 | Lee, Jr. | 260/42.18 |
| 4,145,377 | 3/1979 | Bussink et al. | 525/68 |
| 4,158,028 | 6/1979 | Izawa et al. | 525/71 |

FOREIGN PATENT DOCUMENTS

| | | | |
|---|---|---|---|
| 49-75663 | of 1974 | Japan | 525/68 |
| 50-51197 | of 1975 | Japan | 525/68 |
| 50-71742 | of 1975 | Japan | 525/68 |
| 52-7069 | of 1977 | Japan | 525/68 |
| 52-96691 | of 1977 | Japan | 525/68 |
| 52-142799 | of 1977 | Japan | 525/68 |
| 53-80492 | of 1978 | Japan | 525/68 |
| 53-94540 | of 1978 | Japan | 525/68 |
| 54-98960 | of 1979 | Japan | 525/68 |

*Primary Examiner*—J. Ziegler
*Attorney, Agent, or Firm*—Armstrong, Nikaido, Marmelstein & Kubovcik

[57] ABSTRACT

A graft copolymer having a styrene polymer grafted onto a trunk polymer consituted of (a) hydrogenated block copolymer of a styrene compound and a diene compound and (b) an olefinic polymer or copolymer is blended with a polyphenylene ether type resin to give a resin composition reduced in anisotropy and having good oil resistance and mechanical properties.

22 Claims, No Drawings

AROMATIC POLYETHER RESIN COMPOSITION

This invention relates to an aromatic polyether resin composition, especially a polyphenylene ether resin composition improved noticeably in anisotropy and having good oil resistance and mechanical properties.

Polyphenylene ether, while it is attractive as one of engineering plastics for excellent properties such as electric property, heat resistance, chemical resistance, dimensional stability, hot water resistance, etc., suffers from drawbacks of poor processability and relatively inferior impact strength. Improvement of processability by lowering softening point can be achieved in a composition comprising homopolymers of polyphenylene ether and styrene type polymers, as is disclosed by U.S. Pat. No. 3,383,435. There is also known a composition comprising homopolymers of polyphenylene ether and poly-$\alpha$-olefins, as is disclosed by U.S. Pat. No. 3,361,851. When a styrene type polymer is incorporated in a polyphenylene ether, which has in itself excellent heat resistance and chemical resistance, for imparting practical processability thereto, these specific features are liable to be lost. For example, through contact with gasoline or machine oil, cleavages may readily be formed under stress, and therefore application in the field where there is contact with such oils is limited. Furthermore, heat resistance and surface appearance are also impaired by reinforcement with polybutadiene or styrene-butadiene random copolymer or styrene-butadiene block copolymer. On the other hand, while processability can be improved by mixing homopolymers of polyphenylene ether with poly-$\alpha$-olefins together with some improvements in resistance to gasoline or machine oil, both resins are incompatible in nature and therefore the resins may suffer from peel-off from each other at the time of molding according to conventional extrusion or injection molding techniques. Accordingly, the resultant molded articles has a bad surface appearance and it is also difficult to improve effectively the impact resistance of the resin composition. For enhancement of compatibility, there is also a proposal to mix a modified poly-$\alpha$-olefin in which styrene monomers are grafted onto poly-$\alpha$-olefins with homopolymers of polyphenylene ether. However, tensile strength which is one of mechanical properties is remarkably lowered in proportion to improvement in processability and the resultant composition is also inferior in rigidity.

There is also known another method in which good compatibility with polyphenylene ether is maintained and mechanical properties can be improved. That is, resin compositions comprising polyphenylene ether resins and modified copolymers in which styrene monomers are grafted onto ethylene-vinyl aliphatic acid copolymer or ethylene-unsaturated carboxylic acid ester copolymer are reported to be excellent in mechanical properties without imparing surface appearance and causing peel-off, as is disclosed by U.S. Pat. No. 4,158,029. Furthermore, improvement of peel-off is proposed by combination of a poly-$\alpha$-olefin and elastomer comprising a hydrogenated conjugated diene block and a vinyl aromatic hydrocarbon block, which are required to be previously blended, with homopolymers of polyphenylene ether, as is disclosed by U.S. Pat. No. 4,145,377. There is also proposed in prior application a composition comprising a combination of an A-B-A type elastomer comprising hydrogenated conjugated diene block and vinyl aromatic hydrocarbon block with poly-$\alpha$-olefin and polyphenylene ether homopolymer, as is disclosed by Japanese published unexamined application No. 88,960/1979.

In weight-saving of articles of manufacture or in molding of a large scale product, when it is desired to make the thickness of the molded article 3 mm or less, any of the compositions as mentioned above of prior art is found to give only molded articles in which impact strengths are so much different from place to place. Typically, there is a great difference in impact strength between the flow direction of the resin and the direction perpendicular thereto. In other words, there is created anisotropy. Such an anisotropy is a vital defect in an engineering plastic. As for polyphenylene ether type resins, it is very important to balance this property with other various characteristics.

The present inventors have made extensive studies for producing molding materials having practical processability as well as excellent oil resistance and impact resistance and being also small in anisotropy and consequently accomplished the present invention. According to the present invention, there is provided an aromatic polyether resin composition comprising a continuous resin phase principally composed of an aromatic polyether resin and dispersed phases which are dispersed in said continuous resin phase, wherein said dispersed phases comprises (a) a hydrogenated product of a block copolymer of a vinyl aromatic hydrocarbon and an aliphatic conjugated diene hydrocarbon and (b) at least one polymer selected from the group consisting of polyolefins, ethylene-vinyl aliphatic acid copolymers and ethylene-unsaturated carboxylic acid ester copolymers, said components (a) and (b) containing (c) an aromatic vinyl compound polymer grafted thereon.

It has been made possible by the composition of the present invention to achieve the improvement not attainable by any of the prior arts, namely to provide molding materials useful in practical and commercial applications which can be produced with small anisotropy and at low cost. The composition provided by the present invention can give molding materials endowed with well-balanced qualities as a whole and is applicable in various uses such as interior or exterior parts of automobiles, electric or electronic instrument parts as well as parts of apparatus for communication and data processing. The composition, in addition to injection molding, can also be processed into films or sheets.

The anisotropy herein mentioned means that the mechanical property in the flow direction from the gate differs from that in the direction perpendicular thereto when a molten resin flows into a mold cavity.

In the present invention, since the difference in Izod impact strength as one item of mechanical properties is most conspicuous, there is adopted Izod impact strength as the item to be measured indicating typical anisotropy tendency. Thus, the index "I", which is the ratio of an Izod impact strength value of a test piece cut out in the flow direction to an Izod impact strength value of a test piece cut out in the direction perpendicular thereto, is defined as a measure indicating anisotropy, namely:

$$I = \frac{\text{Izod impact strength of a test piece cut out in the flow direction}}{\text{Izod impact strength of a test piece cut out in the direction perpendicular to the flow direction}}$$

As the value of I approaches 1, the resin has less anisotropy. Such an anisotropy can sometimes be determined according to a simplified method from the ratio of the Izod impact strengths measured for the test pieces cut out in the flow direction and in the direction perpendicular thereto, respectively, from an injection molded flat plate. In the present invention, a flat plate (150 mm×150 mm; thickness=2.6 mm) is injection molded by one point pinpoint gate and rectangular test strips are cut out therefrom in the flow direction and in the direction perpendicular thereto. The test strips are subjected to measurement according to JIS K 7110. The ratio of the measured Izod impact strength values is calculated to give the value of I as a measure of anisotropy. In a polyphenylene type resin composition containing the component as defined in claim 2, the value of I is observed to be 3 to 5. In contrast, in the composition prepared by the present invention, said value is in the neighborhood of 1, indicating well-balanced qualities as a whole.

The aforesaid characteristic of the resin composition according to the present invention can be speculated to be due to the specific structure as mentioned below. That is, the resin composition of the present invention is constituted of a continuous resin phase comprising an aromatic polyether resin and dispersed phases which are dispersed like islands therein. Said dispersed phases comprise two differnt components of (a) a hydrogenated product of a block polymer of a vinyl aromatic hydrocarbon and an aliphatic conjugated diene hydrocarbon and (b) a polymer or a copolymer of an olefinically unsaturated compound, each of said components containing (c) a vinyl aromatic compound copolymer grafted thereon. There may also be included in said dispersed phases copolymers containing the component (c) grafted onto trunk copolymers comprising the components (a) and (b) partially bonded (interpolymerized). Such dispersed phases are dispersed like islands throughout the continuous resin phase. With such dispersion forms and strength characteristics exhibiting no directional specificity, the resin composition of the present invention is believed to be reduced in molding anisotropy.

In the following, the constituting elements of the present invention are to be described in detail.

(1) Continuous resin phase

The aromatic polyether resin which forms the continuous resin phase in the composition of the present invention refers to a polyphenylene ether represented by the formula:

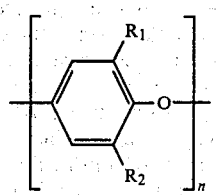

wherein $R_1$ and $R_2$ are alkyls having 1 to 4 carbon atoms, excluding tert-butyl, halogen atoms or substituents selected from the group consisting of halogenated hydrocarbon and halogenated hydrocarbonoxy groups having at least two carbon atoms between the benzene nucleus and halogen atom and containing no tertiary atom; and n is an integer of 50 or more indicating degree of polymerization, or a copolymer thereof and modified resins of these. Typical examples of polyphenylene ether are homopolymers such as poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene) ether, poly(2-methyl-6-chloro-1,4-phenylene)ether, poly(2-methyl-6-hydroxyethyl-1,4-phenylene)ether, poly(2-methyl-6-chloroethyl-1,4-phenylene)ether, and the like.

Polyphenylene ether copolymers are inclusive of those principally composed of the aforesaid polyphenylene ether structure obtained by copolymerization with an alkyl-substituted phenol represented by the following formula, typically o-cresol-2,3,5-trimethylphenol:

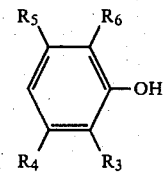

wherein $R_3$ is an alkyl having 1 to 4 carbon atoms, $R_4$, $R_5$ and $R_6$ are hydrogens or alkyls having 1 to 4 carbon atoms.

As polyphenylene ether type modified resins, there may be mentioned alkylbenzene-formaldehyde resin modified polyphenylene ether copolymers comprising the aforesaid polyphenylene ether block as principal structure and alkylphenol-modified alkylbenzene-formaldehyde resin block obtained by reaction of alkylbenzene-formaldehyde resin with alkylphenol such as cresol-p-tert-butyl phenol; and polyphenylene ether graft copolymers modified with aromatic vinyl compound polymers comprising aromatic vinyl compound polymers grafted onto the aforesaid polyphenylene ether homopolymers or polyphenylene ether copolymers principally composed of said structure and containing substantially no homoplymer of polyphenylene ether. In the continuous resin phase in the composition of the present invention, there may also be present a styrene type resin together with the aforesaid aromatic polyether resin.

In the polyphenylene ether graft copolymers modified with aromatic vinyl compound polymers as mentioned above, 3 to 100 wt.%, preferably 10 to 50 wt.% of aromatic vinyl compound polymers are grafted onto homopolymers of polyphenylene ether or polyphenylene ether copolymers principally composed of said structure. The substantial absence of homopolymers of polyphenylene ether can be confirmed by the method reported by A. Factor et al (J. Polymer Sci. 7B, 205, 1969). Presence of homopolymers of polyphenylene ether can be detected by separation of a complex with methylene chloride precipitated from a methylene chloride solution thereof. When a polyphenylene ether graft copolymer is dissolved in methylene chloride, it can be dissolved homogeneously and usually there is no precipitation formed within 3 hours. Even if a precipitate insoluble in methylene chloride may be formed after prolonged standing, the polymer obtained by washing thoroughly such a precipitate, followed by drying, contains difficultly separable aromatic vinyl compound polymers therein.

For obtaining an aromatic polyether resin composition improved in anisotropy, it is most preferred to use a polyphenylene ether graft copolymer modified with an aromatic vinyl compound polymer. Such a graft copolymer can provide a resin composition having well-balanced qualities with small anisotropy, while maintaining high processability, and being also excellent in impact strength as well as oil resistance.

The number average polymerization degree (n) of polyphenylene ether may be from 50 to 500, preferably from 75 to 250. With a number average polymerization degree less than 50, the resin composition obtained has too poor physical properties such as Izod impact strength to be practically used. More than 500, the resultant composition is deteriorated in processability and shows a tendency to be gelled.

The polyphenylene ether graft copolymer modified with an aromatic vinyl compound polymer as mentioned above can be prepared by adding 0.3 to 5 wt. parts, preferably 1.5 to 4 wt. parts of a radical initiator and 10 to 150 wt. parts, preferably 20 to 60 wt. parts of styrene type monomer to 100 wt. parts of a polyphenylene ether homopolymer or a polyphenylene ether copolymer principally composed of this structure and then carrying out polymerization either in the presence of an organic solvent with stirring at a temperature from 130° to 200° C. or in the absence of a solvent at a temperature from 200° to 330° C., preferably 230° to 300° C., while giving a shearing stress. If desired, there may also be added a styrene type resin during polymerization.

The styrene type resin which may be co-present in the aforesaid continuous resin phase of aromatic polyether may be exemplified by an aromatic vinyl compound polymer or a rubber-modified vinyl aromatic compound polymer. Typical examples of such styrene type resins may include homopolymers of styrene, styrene copolymers containing 90% or more of styrene and rubber-modified products of these polymers. As typical examples of comonomers which may be contained in styrene copolymers, there may be mentioned those styrene monomers to be grafted in the dispersed phases as hereinafter described.

(2) Dispersed phase

One component constituting the dispersed phase in the composition of the present invention is a hydrogenated product of a block copolymer of a vinyl aromatic hydrocarbon and an aliphatic conjugated diene hydrocarbon onto which there is grafted a vinyl aromatic hydrocarbon polymer (hereinafter referred to merely as hydrogenated product). As such block copolymers, there may be employed any block copolymer having a structure in which at least one block A comprising substantially recurring units of a vinyl aromatic hydrocarbon and at least one block B comprising substantially recurring units of an aliphatic conjugated diene hydrocarbon are combined. There is no limitation in sequence of such blocks or in structures, whether it may be linear type, teleradial type, etc. More specifically, there may be mentioned those having linear structures such as $(AB)_m$, $(BA)_m$, $A(BA)_m$ or $B(AB)_m$ (each m represents an integer) or those having a structure in which these linear structures are bonded radially (e.g. teleradial type). As a vinyl aromatic hydrocarbon which constitutes A, there may be mentioned styrene, vinyl toluene, vinyl xylene, ethyl vinyl benzene, ethyl vinyl toluene, vinyl naphthalene, α-methyl styrene and the like. A represents a block comprising a homopolymer or a copolymer of these monomers. As an aliphatic conjugated diene hydrocarbon which constitutes B, there may be mentioned butadiene, isoprene, 1,3-pentadiene, etc. B represents a block comprising a homopolymer or a copolymer of these monomers. The hydrogenated block copolymer of the present invention can be prepared by hydrogentating such block copolymers using a hydrogenation catalyst such as nickel or palladium to a hydrogenation degree of preferably 80% saturation based on the aliphatic double bonds before hydrogenation. The block copolymer before hydrogenation comprises 20 to 45 wt.% of a vinyl aromatic hydrocarbon and 80 to 55 wt.% of an aliphatic conjugated diene hydrocarbon. Outside said range, it is difficult to obtain a composition with small anisotropy intended by the present invention even by grafting of a styrene type resin together with a polyolefin, an ethylene-vinyl aliphatic acid copolymer or an ethylene-unsaturated carboxylic acid ester copolymer.

The other component in the dispersed phases in the composition of the present invention is a polyolefin, an ethylene-vinyl aliphatic acid copolymer and/or an ethylene-unsaturated carboxylic acid ester copolymer.

The polyolefin to be used in the present invention may include poly-α-olefins such as polyethylene, polypropylene, polybutene, etc.; random and block copolymers of ethylenepropylene; random and block copolymers of ethylene-butene; other copolymers of ethylene and α-olefin; and ethylenepropylene-non-conjugated diene terpolymers.

The ethylene-vinyl aliphatic acid copolymer to be used in the present invention can be prepared by, for example, radical polymerization of ethylene and vinyl aliphatic acid, and may contain 40 mol % or less of a vinyl aliphatic acid. Typical examples of vinyl aliphatic acid are vinyl acetate, vinyl butyrate, vinyl laurate, etc. Such a copolymer containing more than 40 mol % of a vinyl aliphatic acid is not practical, because it is less stable to heat at a temperature not less than 250° C.

The ethylene-unsaturated carboxylic acid ester to be used in the present invention can be prepared by, for example, radical polymerization of ethylene and an unsaturated carboxylic acid ester, and may generally contain 40% or less of an unsaturated carboxylic acid ester. Typical examples of unsaturated carboxylic acid ester may include acrylates such as methyl acrylate, ethyl acrylate, butyl acrylate, 2-ethylhexyl acrylate, stearyl acrylate, etc.; methacrylates such as methyl methacrylate, ethyl methacrylate, 2-ethylhexyl methacrylate, stearyl methacrylate, etc.; monoesters and diesters of α,β-unsaturated dicarboxylic acids such as monomethyl itaconate, monobutyl itaconate, dibutyl itaconate, etc. By use of a copolymer with more than 40 mol % of unsaturated carboxylic acid, graft polymerization of styrene monomer is difficult and the physical properties of the final composition are also deteriorated.

In the modified resin constituting the dispersed phase according to the present invention, there is grafted 5 to 100 wt.%, preferably 10 to 50 wt.%, of (c) an aromatic vinyl compound polymer onto a trunk polymer comprising (a) a hydrogenated product of a block copolymer of a vinyl aromatic hydrocarbon and an aliphatic conjugated diene hydrocarbon and (b) a polyolefin or an ethylene-vinyl aliphatic acid copolymer or an ethylene-unsaturated carboxylic acid ester copolymer. Less than 5 wt.%, anisotropy is too large, whereby the surface appearance is bad. Over 100 wt.%, heat resistance, processability and impact strength are degraded, anisotropy being also enlarged.

Such a modified resin can be prepared by adding 0.1 to 3 wt. parts, preferably 0.3 to 2 wt. parts of a radical initiator and 10 to 200 wt. parts, preferably 20 to 100 wt. parts of styrene monomer to 100 wt. parts of a trunk polymer comprising (a) and (b) and effecting graft polymerization in the presence or absence of a solvent at a temperature in the range from 130° to 300° C. For example, in the absence of a solvent, polymerization can be conducted at a temperature in the range from 160° to 250° C., while giving a shearing stress, to obtain a desired modified resin.

The resin composition of the present invention can be provided by blending in conventional manner the aromatic polyether resin constituting the continuous resin phase with the modified resin constituting the dispersed phase, each being prepared separately, optionally in the co-presence of a styrene type resin.

Alternatively, when a polyphenylene ether graft copolymer modified with an aromatic vinyl compound polymer is used as the aromatic polyether resin, the composition of the present invention can be prepared in one step by adding 15 to 200 wt. parts, preferably 25 to 90 wt. parts of a styrene type monomer and 0.3 to 5 wt. parts, preferably 1.5 to 3 wt. parts of a radical initiator to 100 wt. parts in total weight of a homopolymer of a polyphenylene ether having the structure represented by the aforesaid formula or a copolymer principally composed of said structure and the components (a) and (b), and effecting polymerization in the absence of a solvent at 200° to 330° C., preferably at 230° to 300° C., while giving a shearing stress.

As the organic solvent to be used in carrying out polymerization in the presence of an organic solvent, there may be employed any solvent which is inert to radicals during radical polymerization and can dissolve the polyphenylene ether employed. Typically, there may be employed such aromatic hydrocarbons as benzene, toluene, xylene, chlorobenzene and so on. There may also be employed in combination an aliphatic hydrocarbon such as n-hexane or cyclohexane in an amount which does not effect precipitation of polyphenylene ether.

The styrene type monomer to be used in the preparation method as described above comprises styrene alone or a mixture of styrene and at least one comonomer radical-copolymerizable with styrene which can be polymerized to give a styrene type resin with content of said comonomer no more than 10%. Examples of such comonomers are α-methyl styrene, vinyl toluene, vinyl xylene, mono-chloro styrene, dichlorostyrene, mono-bromo styrene, dibromostyrene, p-tertbutyl styrene, ethyl styrene, vinyl naphthalene and other alkylated or halogenated styrene derivatives; methacrylates such as methyl methacrylate or ethyl methacrylate; acrylates such as methyl acrylate, butyl acrylate, 2-ethylhexyl acrylate, etc.; unsaturated nitriles such as acrylonitrile or methacrylonitrile; unsaturated acid anhydrides such as maleic anhydride, itaconic anhydride, citraconic anhydride, etc.; unsaturated acids such as acrylic acid, methacrylic acid, etc.

The vinyl aromatic compound polymer which is grafted on the dispersed phase according to the present invention is a polystyrene or a copolymer of styrene with not more than 10 wt.% of at least one comonomer component as mentioned above. By use of a copolymer containing more than 10 wt.% of comonomer, it is difficult to achieve the object of the present invention, namely to make anisotropy smaller.

As polymerization initiators generating radicals to be used in the preparation method as described above, there may be used organic peroxides including di-tert-butyl peroxide, benzoyl peroxide, lauroyl peroxide, dicumyl peroxide, cumene hydroperoxide, 2,5-dimethyl-2,5-di-(tertbutylperoxy)hexane, etc. and inorganic peroxides including potassium persulfate, sodium persulfate, sodium perborate, etc. Such radical polymerization initiators may be used also as a combination of two or more species, depending on the changes in polymerization temperature.

The total amount of the components (a) and (b) contained in the dispersed phases in the composition of the present invention may vary from 2 to 40 wt.% based on the total composition, preferably from 5 to 25 wt.%. Less than 2 wt.%, there is no improvement of oil resistance. Over 40 wt.%, rigidity and heat resistance are deteriorated. At the same time, when the ratio of (a) to (b) is in the range from ¼ to 4/1, the balance between anisotropy and other properties can be best. Outside said range, anisotropy is increased. From economical standpoint, a ratio of (a) to (b) in the range from ¼ to 1/1 is most preferred.

By microscopic observation of a ultra-thin specimen of the composition according to the present invention stained with osmium tetra-oxide, although its causal dependence has not been elucidated so far, it can be confirmed that the components (a) and (b) are dispersed morphologically as islands in the continuous resin phase. The composition of the present invention, which contains the modified resin comprising (c) grafted onto (a) and (b) as dispersed phases, is smaller in anisotropy than conventionally known aromatic polyether resin compositions, more specifically, polyphenylene ether type resin compositions, and has additionally excellent oil resistance, impact strength and processability.

There may also be incorporated stabilizers, flame-retardants, glass fibers, carbon fibers, insofar as these materials do not significantly damage the characteristics of the present composition.

The present invention is further illustrated with reference to the following Examples, which are set forth for only illustrative purpose and should not be construed as limitative of the scope of the invention. The data in the Examples are values measured by the following methods, unless otherwise noted.

Izod impact strength: A flat plate (150 mm × 150 mm, thickness = 2.6 mm) is molded and test pieces are cut out therefrom in the flow direction of the resin and in the direction perpendicular thereto. Measurement is performed with notch according to JIS K 7110:

Melt index: measured at 250° C. under load of 10 Kg;

Tensile strength: measured according to JIS K 7113;

Deflection temperature under load: measured according to JIS K 7207;

Oil resistance: evaluated as minimum strain (critical strain) formed when contacted with machine oil for 24 hours;

Relation between number average molecular weight $\overline{Mn}$ and intrinsic viscosity $[\eta]$ of a homopolymer of polyphenylene ether [which is poly(2,6-dimethyl-1,4-phenylene)ether]:

$$[\eta] = 1.47 \times 10^{-4} \overline{Mn}^{0.85}$$

(wherein the intrinsic viscosity is represented in terms of the unit dl/g and measured in chloroform solution at 30° C.). Since the molecular weight of the repeating unit in the polymer is 120, the number average polymerization degree can readily be calculated from [η]. In Examples, the molecular weight is shown in terms of the intrinsic viscosity.

All parts and percentages in Examples are by weight, unless otherwise noted.

EXAMPLE 1

A mixture comprising 33 parts of powdery hydrogenerated block copolymer (Kraton G 1650; trade name, Shell Chem. Co.), 67 parts of pulverized ethylene-methyl methacrylate copolymer (methyl methacrylate content=13%; MI=12); 35 parts of styrene monomer and 0.3 part of di-tert-butyl peroxide is subjected to extrusion through an extruder (diameter=30 mm; L/D=30) with screws rotating in the opposite directions at 50 r.p.m. under the condition of the maximum temperature at 220° C. to give a polystyrene-grafted copolymer (A) comprising the hydrogenated block copolymer and the ethylene-methyl methacrylate copolymer.

One hundred (100) parts of a poly(2,6-dimethyl-1,4-phenylene)ether having an intrinsic viscosity of 0.48, 30 parts of styrene monomer, 115 parts of homopolystyrene (Styron 685, trade name, Asahi-Dow Limited) and 2.1 parts of di-tert-butyl peroxide are mixed by means of a Henschel mixer. The resultant mixture is subjected to extrusion through a 30 mmφ extruder (L/D=30) with screws rotating in the opposite direction at 60 r.p.m. under the condition of the maximum temperature at 280° C. to give a polystyrene-grafted polyphenylene ether copolymer (B).

A mixture comprising 25 parts of (A) and 75 parts of (B) is extruded through a 40 mmφ single screw extruder (L/D=28) rotating at 80 r.p.m. at maximum temperature of 290° C. to obtain a resin composition. The resultant composition is found to have Izod impact strengths of 39 Kg·cm/cm in the flow direction and 28 Kg·cm/cm in the perpendicular direction, respectively, I=1.5, a tensile strength of 430 Kg/cm², a melt index of 5 and a deflection temperature under load of 131° C. It has also a smooth appearance and an injection molded piece can be bent without any such peel-off like a bamboo sheaf. Analysis of the graft copolymer (A) is conducted in the same manner as in Example 6, whereby the percentage of polystyrene grafted onto the trunk polymer comprising the hydrogenated block copolymer and the ethylene-methyl methacrylate copolymer is calculated to be 15%.

EXAMPLE 2

A mixture comprising 100 parts of a poly(2,6-dimethyl-1,4-phenylene)ether having an intrinsic viscosity of 0.46, 20 parts of a homopolystyrene (Styron 683, trade name, Asahi-Dow Limited), 30 parts of a pulverized ethylene-methyl methacrylate copolymer (methyl methacrylate content=14%, MI=11), 10 parts of a powdery hydrogenated block copolymer (Kraton G 1650, trade name, Shell Chem. Co.) 40 parts of styrene monomer and 3 parts of di-tert-butyl peroxide, while being mixed under high speed agitation, is subjected to extrusion through a 30 mmφ opposite-rotatory twin screw extruder (L/D=30) rotating at 60 r.p.m. at the maximum temperature of 260° C. to give a resin composition (C). The resultant composition is found to have Izod impact strengths of 41 Kg·cm/cm in the flow direction and of 29 Kg·cm/cm in the perpendicular direction, respectively, I=1.4, a tensile strength of 400 Kg/cm², a melt index of 8 and a deflection temperature under load of 125° C. Its appearance is smooth and an injection molded piece, when bent, is free from peel-off like a bamboo sheaf.

Ten (10) grams of the resin composition (C) are dissolved in 100 ml of hot toluene and, after cooling, the solution is subjected to centrifuge (at 19,000 r.p.m. for one hour). The supernatant (toluene solubles) is poured into methanol and the resultant re-precipitate is filtered, washed with methanol and dried. The re-precipitated polymer (2 g) is dissolved in 40 ml of methylene chloride and left to stand at 30° C. After 3 hours, no precipitate is found to be formed. From infra-red absorption spectrum analysis and the weight of the insolubles, the graft percentage of polystyrene onto the trunk polymer comprising the ethylene-methyl methacrylate copolymer and the hydrogenated block copolymer is calculated to be 18%.

EXAMPLE 3

Graft polymerization is carried out according to the same procedure as in Example 1 except for using an ethylene-vinyl acetate copolymer (vinyl acetate content=22%, MI=7) in place of the ethylene-methyl methacrylate copolymer to obtain resin composition (D). The resultant composition is found to have Izod impact strengths of 41 Kg·cm/cm in the flow direction and of 29 Kg·cm/cm in the perpendicular direction, I=1.4, a tensile strength of 390 Kg/cm², a melt index of 9 and a deflection temperature under load of 125° C. Its appearance is found to be smooth. When an injection molded piece is subjected to bending, there is no peel-off like a bamboo sheaf. Analysis of the resin composition (D) conducted similarly as in Example 2 gives no detectable precipitation of methylene chloride after 3 hours. The percentage of polystyrene grafted onto the trunk polymer comprising the ethylene-vinyl acetate copolymer and the hydrogenated block copolymer, as calculated from infra-red absorption spectrum analysis and the weight of insolubles, is found to be 16%.

EXAMPLE 4

There is prepared a resin composition (E) by graft polymerization according to the same method as in Example 2 except for replacing the ethylene-methyl methacrylate copolymer with a polyethylene (Asahi-Dow polyethylene M 1703, MI=0.35, Asahi-Dow Limited). The resin composition is found to have Izod impact strengths of 36 Kg·cm/cm in the flow direction and of 22 Kg·cm/cm in the perpendicular direction, I=1.6, a tensile strength of 400 Kg/cm², a melt index of 11 and a deflection temperature under load of 121° C., with the appearance being smooth. No peel-off like a bamboo sheaf is observed when bending an injection molded piece. Analysis of the resin composition (E) is conducted according to the same method as in Example 2, whereby no precipitation of methylene chloride can be detected after 3 hours. The percentage of polystyrene grafted onto the trunk polymer comprising the polyethylene and the hydrogenated block copolymer is calculated from infra-red absorption spectrum analysis and the weight of the insolubles to be 17%.

COMPARATIVE EXAMPLE 1

A blend comprising 20 parts of a powdery hydrogenated block copolymer (Kraton G; 1650; Shell Chem. Co.), 60 parts of the ethylene-methyl methacrylate copolymer (the same as employed in Example 2) and 40 parts of a homopolystyrene (Styron 683, Asahi-Dow Limited) is prepared by a blender. The blend is then extruded into pellets through a 40 mm$\phi$ single screw extruder (L/D=28) under the conditions of the maximum temperature at 240° C. and screw rotation at 75 r.p.m. Sixty (60) parts of the pre-blended pellets are mixed with 100 parts of a poly(2,6-dimethyl-1,4-phenylene)ether having an intrinsic viscosity of 0.46 and 40 parts of a homopolystyrene (Styron 683, Asahi-Dow Limited) by means of a Henschel mixer. The resultant blend is extruded through a 30 mm$\phi$ opposite-rotatory twin screw extruder under the conditions of the maximum temperature at 300° C. and the screw rotation at 60 r.p.m. to obtain a resin composition. The resultant composition is found to have Izod impact strengths of 24 Kg·cm/cm in the flow direction and of 5 Kg·cm/cm in the perpendicular direction, respectively, I=4.8, a tensile strength of 370 Kg/cm$^2$, a melt index of 3 and a deflection temperature under load of 120° C. It has an appearance exhibiting silver streaks and, when an injection molded piece is bent, there is observed some peel-off like a bamboo sheaf.

COMPARATIVE EXAMPLE 2

There is prepared a resin composition under the same conditions as in Example 1 from 100 parts of a poly(2,6-dimethyl-1,4-phenylene)ether having an intrinsic viscosity of 0.46, 30 parts of a homopolystyrene (Styron 683; Asahi-Dow Limited), 30 parts of the pulverized ethylene-methyl methacrylate copolymer (the same as employed in Example 2), 40 parts of styrene monomer and 3 parts of di-tert-butyl peroxide. The resultant composition is found to have Izod impact strengths of 38 Kg·cm/cm in the flow direction and of 10 Kg·cm/cm in the perpendicular direction, I=3.8, a tensile strength of 490 Kg/cm$^2$, a melt index of 7 and a deflection temperature under load of 122° C. The appearance is smooth but some silver streaks are observed. No peel-off like a bamboo sheaf is observed when an injection molded piece is subjected to bending.

COMPARATIVE EXAMPLE 3

Polymerization is carried out under the same conditions as in Example 2 using 100 parts of a poly(2,6-dimethyl-1,4-phenylene)ether having an intrinsic viscosity of 0.46, 20 parts of a homopolystyrene (Styron 683; Asahi-Dow Limited), 40 parts of styrene monomer and 2.2 parts of di-tert-butyl peroxide. This polymer (160 parts) is blended by a blender with 30 parts of a rubber-modified polystyrene containing 40% polybutadiene rubber and 10 parts of a homopolystyrene (Styron 683; Asahi-Dow Limited). The resultant blend is subjected to extrusion through a 30 mm$\phi$ opposite-rotatory twin screw extruder under the conditions of the maximum temperature at 280° C. and the screw rotation at 60 r.p.m. to obtain a resin composition. The resultant composition is found to have Izod impact strengths of 18 Kg·cm/cm in the flow direction and of 13 Kg·cm/cm in the perpendicular direction, I=1.4, a tensile strength of 520 Kg/cm$^2$, a melt index of 11 and a deflection temperature under load of 123° C. It has a smooth appearance and free from peel-off in an injection molded piece subjected to bending.

Table 1 shows critical strain percentages of the above compositions in a turbine oil (Nippon Oil Co. Ltd.; FBK turbine oil), indicating that those of Examples 2 to 4 have small anisotropy and good oil resistance.

TABLE 1

| | Oil resistance and anisotropy | |
|---|---|---|
| | Critical strain % | I (anisotropy) |
| Example 2 | 1.6 | 1.4 |
| Example 3 | 1.5 | 1.4 |
| Example 4 | 1.6 | 1.6 |
| Comparative example 1 | 1.0 | 4.8 |
| Comparative example 2 | 1.3 | 4.4 |
| Comparative example 3 | 0.5 | 1.4 |

EXAMPLE 5

One hundred (100) parts of a poly(2,6-dimethyl-1,4-phenylene)ether having an intrinsic viscosity of 0.49, 10 parts of a homopolystyrene (Styron 685; Asahi-Dow Limited), 22 parts of a pulverized ethylene-butyl acrylate copolymer (butyl acrylate content=6%, MI=9), 18 parts of a powdery hydrogenated block copolymer (Kraton G 1652; Shell Chem. Co.), 30 parts of styrene monomer and 3 parts of di-tert-butyl peroxide are blended by a Henschel mixer. The resultant blend is subjected to extrusion through a 50 mm$\phi$ twin screw extruder (L/D=34) rotating in the same direction at 60 r.p.m. at the maximum temperature of 270° C. to give a resin composition (F). The resin composition (90 parts) is then compounded in a tumbler with 10 parts of a rubber-modified polystyrene (Styron XH 602: Asahi-Dow Limited), 0.5 part of n-octadecyl-3-(4'-hydroxy-3',5'-di-tert-butyl phenol) propionate(Irganox 1076; Chiba-Geigy Co.), 0.5 part of 4,4'-butylidene-bis(3-methyl-6-tert-butyl phenol) (Sumilizer BBM; Sumitomo Chemical Co., Ltd.) and 0.25 part of distearyl thiopropionate (Sumilizer TPS; Sumitomo Chemical Co., Ltd.). The resultant blend is extruded through a 50 mm$\phi$ same-directional twin screw extruder under the conditions of the maximum temperature of 280° C. and the screw rotation at 60 r.p.m. to give a resin composition. The composition is found to have Izod impact strengths of 28 Kg·cm/cm in the flow direction and 23 Kg·cm/cm in the perpendicular direction, I=1.2, a tensile strength of 480 Kg/cm$^2$, a melt index of 9 and a deflection temperature under load of 120° C. The appearance is smooth and there is no peel-off observed at all. Analysis of the resin composition (F) is conducted by the same method as in Example 2, whereby no precipitate of methylene chloride is detected after 3 hours. From the infra-red absorption spectrum analysis and the weight of insolubles, the percentage of polystyrene grafted onto the trunk polymer comprising the ethylene-butyl acrylate copolymer and the hydrogenated block copolymer is calculated to be 17%.

EXAMPLE 6

A blend prepared by means of a Henschel mixer comprising 55 parts of the ethylene-butyl acrylate copolymer (the same as used in Example 2), 45 parts of a powdery hydrogenated block copolymer (Kraton G 1652; Shell Chem. Co.), 25 parts of a homopolystyrene (Styron 685; Asahi-Dow Limited), 20 parts of styrene monomer and 0.3 part of di-tert-butyl peroxide is extruded through a 50 mm$\phi$ same-directional twin screw extruder under the conditions of the maximum temperature at 230° C. and the screw rotation at 60 r.p.m. to give a resin composition (G). The resin composition (29 parts) is compounded by a Henschel mixer with 50 parts of a poly(2,6-dimethyl-1,4-phenylene)ether having an intrinsic viscosity of 0.49, 10 parts of a rubber-modified polystyrene (Styron XH 602; Asahi-Dow Limited), 11 parts of a homopolystyrene (Styron 685; Asahi-Dow Limited), 0.5 part of n-octadecyl-3-(4'-hydroxy-3',5-di-tert-butylphenol) (Irganox 1076; Chiba-Geigy Co.), 0.5 part of 4,4'-butylidene bis(3-methyl-3-methyl-6-tert-butyl phenol) (Sumilizer BBM; Sumitomo Chemical Co., Ltd.) and 0.25 part of distearyl thiopropionate (Sumilizer TPS; Sumitomo Chemical Co., Ltd.). The mixture is then extruded through a 50 mm$\phi$ same-directional rotatory twin screw extruder under the conditions of the maximum temperature at 300° C. and screw rotation at 60 r.p.m. to obtain the final resin composition. The final resin composition obtained is found to have Izod impact strengths of 27 Kg·cm/cm in the flow direction and of 18 Kg·cm/cm in the perpendicular direction, I=1.5, a tensile strength of 460 Kg/cm$^2$, a melt index of 5 and a deflection temperature under load of 120° C. The appearance is smooth and there is no peel-off phenomenon. The resin composition (G) (5 g) is dissolved in 100 ml of hot toluene and, after cooling, subjected to centrifuge (at 19,000 r.p.m. for one hour), followed by removal of the supernatant. From the infrared absorption analysis and the weight of the insolubles, the percentage of polystyrene grafted onto the trunk polymer comprising the ethylene-butyl acrylate copolymer and the hydrogenated block copolymer is found to be 17%.

EXAMPLE 7

A mixture comprising 100 parts of a poly(2,6-dimethyl-1,4-phenylene)ether having an intrinsic viscosity of 0.48, 30 parts of a homopolystyrene (Styron 685; Asahi-Dow Limited), 24 parts of a pulverized ethylene-methyl methacrylate copolymer (methyl methacrylate content=11%, MI=10), 12 parts of a powdery hydrogenated block copolymer (Kraton G 1650; Shell Chem., Co.), 34 parts of styrene monomer and 3.2 parts of di-tert-butyl peroxide, while being subjected to a high speed stirring, is fed through a 50 mm$\phi$ same-directional rotatory twin screw extruder (L/D=34) under the conditions of the maximum temperature of 290° C. and the screw rotation at 70 r.p.m. to be extruded into a resin composition (H). The composition obtained is found to have Izod impact strengths of 31 Kg·cm/cm in the flow direction and of 24 Kg·cm/cm in the perpendicular direction, I=1.3, a tensile strength of 430 Kg/cm$^2$, a melt index of 8 and a deflection temperature under load of 124° C. It has a smooth appearance and free from peel-off like a bamboo sheaf in an injection molded piece subjected to bending. The resin composition (H) is analyzed similarly as in Example 1, whereby no precipitate of methylene chloride is detected after 3 hours. The graft percentage of polystyrene onto the trunk polymer comprising ethylene-methyl methacrylate and the hydrogenated block copolymer, as calculated from the infra-red absorption spectrum and the weight of the insolubles, is found to be 17%.

EXAMPLES 8 to 11

Example 2 is repeated except that the proportions of the hydrogenated block copolymer (a) to the ethylene-methyl methacrylate are varied to give the results as set forth on Table 2.

Each composition has a smooth appearance and no peel-off like a bamboo sheaf is observed in the injection molded test piece subjected to bending.

TABLE 2

| | Unit | Measured physical property values of the compositions | | | | |
|---|---|---|---|---|---|---|
| | | Example 2 | Example 8 | Example 9 | Example 10 | Example 11 |
| Hydrogenated copolymer (a) | parts | 10 | 8 | 16 | 24 | 32 |
| Ethylene-methyl methacrylate copolymer (b) | parts | 30 | 32 | 24 | 16 | 8 |
| wt. ratio of (a) to (b) | — | 1/3 | 1/4 | 2/3 | 3/2 | 4/1 |
| Izod impact strength: | | | | | | |
| Flow direction | Kg·cm/cm | 41 | 41 | 41 | 43 | 45 |
| Perpendicular direction | Kg·cm/cm | 29 | 29 | 29 | 28 | 28 |
| I: | — | 1.4 | 1.4 | 1.4 | 1.5 | 1.6 |
| Tensile strength | Kg/cm$^2$ | 400 | 400 | 410 | 420 | 440 |
| Melt index | g/10 min. | 8 | 8 | 8 | 8 | 9 |
| Deflection temperature under load | °C. | 125 | 125 | 125 | 124 | 123 |

COMPARATIVE EXAMPLE 4

A blend prepared by means of a Henschel mixer comprising 50 parts of a poly(2,6-dimethyl-1,4-phenylene) ether having an intrinsic viscosity of 0.46, 30 parts of a homopolystyrene (Styron 683; Asahi-Dow Limited) and 20 parts of a powdery hydrogenated block copolymer (Kraton G 1650; Shell Chem. Co.) is extruded through a 30 mm$\phi$ opposite-rotatory twin screw extruder (L/D=30) under the conditions of the maximum temperature at 300° C. and the screw rotation at 60 r.p.m. to obtain a resin composition. The resultant composition is found to have Izod impact strengths of 46 Kg·cm/cm in the flow direction and of 13 Kg·cm/cm in the perpendicular direction, I=3.5, a tensile strength of 350 Kg/cm$^2$, a melt index of 3 and a deflection temperature under load of 120° C. The appearance is smooth but there are silver streaks observed. A very slight peel-off like a bamboo sheaf is observed when an injection molded piece is subjected to bending. The critical strain in turbine oil is found to be 0.8%.

EXAMPLE 12

A resin composition (P) is prepared exactly the same manner as in Example 6 except that a hydrogenated product of Solprene 411 (Philips Petroleum Co.) is used in place of the Kraton G 1650. Said hydrogenated product is prepared by adding a solution of Solprene 411 in cyclohexane under hydrogen pressure at room temperature to a hydrogenation catalyst comprising nickel acetyl acetonate and tri-isobutyl aluminum prepared in cyclohexane and allowing the resultant mixture to react under a hydrogen pressure of 40 Kg/cm$^2$ for 70 minutes. The percentage of the residual aliphatic double bonds is measured by infra-red absorption spectrum to be 9% based on the content before hydrogenation. The composition obtained is found to have Izod impact strengths of 30 Kg·cm/cm in the flow direction and of 23 Kg·cm/cm in the perpendicular direction, I=1.3, a tensile strength of 430 Kg/cm², a melt index of 7 and a deflection temperature under load of 124° C. The appearance is smooth with no peel-off like a bamboo sheaf in an injection molded piece subjected to bending. By analysis of the resin composition (P) by the same method as in Example 1, there can be detected no precipitation of methylene chloride after 3 hours. The percentage of polystyrene grafted onto the trunk polymer comprising the ethylene-methyl methacrylate copolymer and the hydrogenated block copolymer is calculated from the infra-red absorption spectrum and the weight of the insolubles to be 21%.

EXAMPLE 13

A resin composition (J) is prepared by repeating Example 6 except for using a hydrogenated product of Tufprene A (produced by Asahi Kasei K.K.) in place of the Kraton G 1650 as hydrogenated block copolymer. Said hydrogenated product is prepared by adding a solution of Tufprene A in n-heptane, under hydrogen pressure at room temperature, to a hydrogenation catalyst comprising nickel acetylacetonate and tri-isobutyl aluminum prepared in cyclohexane and allowing the resulting mixture to react at 40° C. under a hydrogen pressure of 35 Kg/cm² for 90 minutes. The percentage of the residual aliphatic double bonds is determined by infrared absorption spectrum to be 8% based on the content before hydrogenation. The resin composition obtained is found to have Izod impact strengths of 34 Kg·cm/cm in the flow direction and of 26 Kg·cm/cm in the perpendicular direction, I=1.3, a tensile strength of 440 Kg/cm², a melt index of 9 and a deflection temperature under load of 124° C. The appearance is found to be smooth and there is no peel-off like a bamboo sheaf when bending an injection molded piece. Analysis of the resin composition (J) is conducted similarly as in Example 2, whereby no precipitation of methylene chloride is detected after 3 hours. The percentage of polystyrene grafted to the trunk polymer comprising the ethylene-methyl methacrylate copolymer and the hydrogenated block copolymer, as calculated from the infra-red absorption spectrum analysis and the weight of the insolubles, is found to be 19%.

EXAMPLE 14

A blend prepared by means of a Henschel mixer comprising 100 parts of a poly(2,6-dimethyl-1,4-phenylene) ether having an intrinsic viscosity of 0.48, 20 parts of a homopolystyrene (styron 685; Asahi-Dow Limited), 30 parts of styrene monomer and 2.1 parts of di-tert-butyl peroxide is subjected to extrusion through a 30 mm$\phi$ opposite-rotatory extruder (L/D=30) under the conditions of the maximum temperature at 280° C. and the screw rotation at 75 r.p.m. to obtain a polystyrene-grafted polyphenylene ether copolymer (K). A mixture comprising 67 parts of a pulverized ethylenemethyl methacrylate copolymer (the same as used in Example 6), 33 parts of a powdery hydrogenated block copolymer (Krafton G 1650; Shell Chem. Co.), 40 parts of styrene monomer, 0.3 part of tert-butyl cumyl peroxide and 0.15 part of di-tertbutyl peroxide is extruded through a 30 mm$\phi$ opposite-rotatory extruder (L/D=30) under the conditions of the maximum temperature of 220° C. and the screw rotation at 75 r.p.m. to obtain a polystyrene-grafted copolymer (Q) of the ethylenemethyl methacrylate copolymer and the hydrogenated block copolymer. A blend comprising 75 parts of (K) and 25 parts of (Q) is extruded through a 40 mm$\phi$ single screw extruder (L/D=28) under the conditions of the maximum temperature at 280° C. and the screw rotation at 80 r.p.m. to prepare a resin composition. The resultant resin composition is found to have Izod impact strengths of 29 Kg·cm/cm in the flow direction and of 21 Kg·cm/cm in the perpendicular direction, I=1.4, a tensile strength of 420 Kg/cm², a melt index of 6 and a deflection temperature under load of 124° C. The appearance is found to be smooth and an injection molded piece is free from peel-off like a bamboo sheaf when subjected to bending. As the result of analysis of the graft copolymer (Q) conducted similarly as in Example 6, the percentage of polystyrene grafted onto the trunk polymer comprising the ethylene-methyl methacrylate copolymer and the hydrogenated block copolymer is calculated to be 18%.

EXAMPLE 15

In a 4-liter autoclave, there are charged 55 parts of ethylbenzene, 35 parts of a poly(2,6-dimethyl-1,4-phenylene) having an intrinsic viscosity of 0.51, 8 parts of an ethylene-propylene-diene terpolymer (EPT 4021; Mitsui Petrochemical Industries, Ltd.), 4 parts of a powdery hydrogenated block copolymer (Kraton G 1650; Shell Chem. Co.), 53 parts of styrene monomer and 0.9 part of di-tert-butyl peroxide. Stirring the mixture at 60° C. to obtain a homogeneous solution, nitrogen gas is then blown into the mixture to purge oxygen out of the polymerization system. While controlling the inner temperature in the autoclave to be maintained at 135° to 160° C., polymerization is carried out for 4 hours. The contents are taken out and dried by means of a vacuum drier at 215° C. for 2 hours to remove ethyl benzene and some unaltered styrene. The residue is extruded through a 40 mm$\phi$ extruder (L/D=28) under the conditions of the maximum temperature at 240° C. and the screw rotation at 70 r.p.m. to obtain a resin composition (R). The resultant resin composition is found to have Izod impact strengths of 19 Kg·cm/cm in the flow direction and of 14 Kg·cm/cm in the perpendicular direction, I=1.4, a tensile strength of 410 Kg/cm², a melt index of 11 and a deflection temperature under load of 112° C. It has a smooth appearance and no peel-off at all. As the result of analysis of the resin composition (R) conducted similarly as in Example 2, no precipitation of methylene chloride is detected after 3 hours. The percentage of polystyrene grafted onto the trunk polymer comprising the ethylene-propylene-diene terpolymer and the hydrogenated block copolymer is calculated from the infra-red absorption spectrum analysis and the weight of insolubles to be 36%.

EXAMPLE 16

Example 15 is repeated except that a monomer mixture comprising 2.5 parts of acrylonitrile and 51.5 parts of styrene is used in place of the styrene monomer to obtain a resin composition (M). The resin composition is found to have Izod impact strengths of 21 Kg·cm/cm in the flow direction and of 14 Kg·cm/cm in the perpendicular direction, I=1.5, a tensile strength of 430 Kg/cm², a melt index of 10 and a deflection temperature under load of 113° C.; said composition having a smooth appearance with no peel-off at all. The resin composition (M) is subjected to analysis by the same method as in Example 2, whereby no precipitation of methylene chloride is detected after 3 hours. From analysis of toluene insolubles, the graft percentage of polystyrene onto the trunk polymer comprising the ethylene-propylene-diene terpolymer and the hydrogenated block copolymer is calculated to be 39%. The acrylonitrile content in the grafted styrene-acrylonitrile copolymer is found to be 5%.

EXAMPLE 17

A mixture comprising 100 parts of a poly(2,6-dimethyl-1,4-phenylene)ether having an intrinsic viscosity of 0.48, 2 parts of a homopolystyrene (Styron 685; AsahiDow Limited), 6 parts of an ethylene-ethyl acrylate copolymer (ethyl acrylate content=9%, MI=11), 5 parts of a powdery hydrogenated block copolymer (Kraton G 1652; Shell Chem. Co.), 28 parts of styrene monomer and 2 parts of di-tert-butyl peroxide is subjected to extrusion through a 30 mmφ opposite-rotatory twin screw extruder (L/D=30) under the conditions of the screw rotation at 60 r.p.m. and the maximum temperature at 270° C. to prepare a resin composition (N). A blend comprising 95 parts of said resin composition and 5 parts of an acrylonitrile-styrene copolymer modified with polybutadiene rubber (acrylonitrile content in acrylonitrile-styrene copolymer=2%; polybutadiene rubber=44%) is extruded through a 40 mmφ single screw extruder (L/D=28) to give the final composition. The final composition obtained is found to have Izod impact strengths of 13 Kg·cm/cm in the flow direction and of 12 Kg·cm/cm in the perpendicular direction, I=1.1, a tensile strength of 710 Kg/cm², a melt index (280° C., under load of 10 Kg) of 12 g/10 min. and a deflection temperature under load of 144° C.; its appearance being smooth with no peel-off at all. The critical strain percentage of said composition in turbine oil is found to be 1.0. Analysis of the resin composition (N) is conducted similarly as in Example 1 to give the result that no precipitation of methylene chloride is detected after 3 hours. From analysis of the resin composition (N) conducted similarly as in Example 6, the graft of polystyrene grafted on the trunk polymer comprising the ethylene-ethyl acrylate copolymer and the hydrogenated block copylmer is calculated to be 14%.

EXAMPLE 18

The resin composition (N) prepared in Example 17 (70 parts) is compounded with 10 parts of rubber-modified polystyrene (Styron QH 405; Asahi-Dow Limited), 20 parts of glass fibers of 3 mm in length (Highbon 3080: PPG Industries) and 0.5 part of n-octadecyl-3-(4'-hydroxy-3',5'-di-tert-butylphenol (Irganox 1076; Chiba-Geigy Co., Ltd.). The resultant resin blend is extruded through a 40 mmφ single screw extruder under the conditions of the screw rotation at 75 r.p.m. and the maximum temperature at 300° C. to prepare a resin composition containing glass fibers. This composition is found to have Izod impact strengths of 8 Kg·cm/cm in the flow direction and of 7 Kg·cm/cm in the perpendicular direction, I=1.1, a tensile strength of 1300 Kg/cm², a melt index (280° C., under load of 10 Kg) of 15 g/10 min. and a deflection temperature under load of 142° C.

EXAMPLE 19

The resin composition (N) prepared in Example 17 (85 parts) is compounded with 5 parts of rubber-modified polystyrene (Styron XH 602; Asahi-Dow Limited), 10 parts of polystyrene modified with polybutadiene containing 40% of rubber, 3.5 parts of triphenyl phosphate, 0.5 part of n-octadecyl-3-(4'-hydroxy-3',5'-di-tert-butyl phenol) (Irganox 1076; Chiba-Geigy Co., Ltd.), 0.25 part of distearyl thiopropionate (Sumilize TPS; Sumitomo Chemical Co., Ltd.) and 0.09 part of tris(nonylphenyl)phosphite (Sumilizer TNP; Sumitomo Chemical Co., Ltd.). The resultant blend is extruded through a 30 mmφ opposite-rotatory twin screw extruder under the conditions of the screw rotation at 40 r.p.m. and the maximum temperature at 270° C. to obtain a final resin composition. The composition is found to have Izod impact strengths of 19 Kg·cm/cm in the flow direction and of 15 Kg·cm/cm in the perpendicular direction, I=1.3, a tensile strength of 530 Kg/cm², a melt index of 12 and a deflection temperature under load of 113° C. The combustion rank according to UL-94 is rated at V-I for 3.2 mm test piece. The composition is found to have a smooth appearance with no peel-off at all.

What we claim is:

1. An aromatic polyether resin composition comprising a continuous resin phase principally composed of an aromatic polyether resin and dispersed phases which are dispersed in said continuous resin phase, wherein said dispersed phases comprise (a) a hydrogenated product of a block copolymer of a vinyl aromatic hydrocarbon and an aliphatic conjugated diene hydrocarbon and (b) at least one polymer selected from the group consisting of poly-olefins, ethylene-vinyl aliphatic acid copolymers and ethylene-unsaturated carboxylic acid ester copolymers, said components (a) and (b) containing (c) an aromatic vinyl compound polymer grafted thereon.

2. A composition according to claim 1, wherein the aromatic polyether resin is a polyphenylene ether represented by the formula:

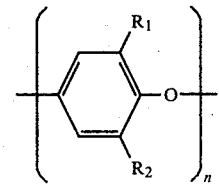

wherein $R_1$ and $R_2$ are alkyls having 1 to 4 carbon atoms, excluding tert-butyl, halogen atoms or substituents selected from the group consisting of halogenated hydrocarbon and halogenated hydrocarbonoxy groups having at least two carbon atoms between the benzene nucleus and the halogen atom and containing no tertiary carbon atom; and n is an integer of 50 or more indicating degree of polymerization, or a copolymer principally composed of said structure.

3. A composition according to claim 1, wherein the aromatic polyether is a polyphenylene ether graft copolymer modified with an aromatic vinyl compound polymer containing substantially no homopolymer of polyphenylene ether, comprising a vinyl aromatic compound polymer grafted onto a polyphenylene ether represented by the formula:

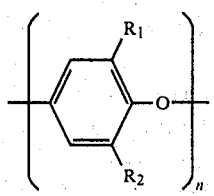

wherein R₁ and R₂ are alkyls having 1 to 4 carbon atoms, excluding tert-butyl, halogen atoms or substituents selected from the group consisting of halogenated hydrocarbon and halogenated hydrocarbonoxy groups having at least two carbon atoms between the benzene nucleus and the halogen atom and containing no tertiary carbon atom; and n is an integer of 50 or more indicating degree of polymerization, or a coplymer principally composed of said structure.

4. A composition according to claim 2 or 3, wherein the polyphenylene ether is poly(2,6-dimethyl-1,4-phenylene) ether.

5. A composition according to claim 1, wherein the continuous resin phase comprises a styrene type resin.

6. A composition according to claim 5, wherein the styrene type resin is a vinyl aromatic compound polymer or a rubber-modified vinyl aromatic compound polymer.

7. A composition according to claim 1, wherein the aromatic vinyl compound polymer (c) is polystyrene.

8. A composition according to claim 1, wherein the aromatic vinyl compound polymer (c) contains 10 wt.% or less of other comonomers, being selected from the group consisting of styrene-acrylonitrile copolymer, styrene-methyl methacrylate copolymer, styrene-acrylonitrilemethyl methacrylate copolymer, styrene-α-methylstyrene copolymer, styrene-methyl methacrylate-α-methylstyrene copolymer, styrene-acrylonitrile-methyl methacrylate-αmethylstyrene copolymer, styrene-chlorostyrene copolymer, styrene-maleic anhydride copolymer, styrene-acrylic acid copolymer, styrene-methacrylic acid-methyl methacrylate copolymer, and styrene acrylic acid-methyl acrylate copolymer.

9. A composition according to claim 1, wherein the polymer (b) is polyethylene.

10. A composition according to claim 1, wherein the polymer (b) is an ethylene-propylene copolymer.

11. A composition according to claim 1, wherein the polymer (b) is an ethylene-propylene-nonconjugated diene terpolymer.

12. A composition according to claim 1, wherein the polymer (b) is an ethylene-vinyl acetate copolymer containing not more than 40 mol % of vinyl acetate.

13. A composition according to claim 1, wherein the polymer (b) is an ethylene-methyl methacrylate copolymer containing not more than 40 mol % of methyl methacrylate.

14. A composition according to claim 1, wherein the hydrogenated product of the block copolymer (a) is a hydrogenated product of a block copolymer comprising 20 to 45 wt.% of a vinyl aromatic hydrocarbon and 55 to 80 wt.% of an aliphatic conjugated diene compound, the degree of hydrogenation being at least 80% saturation of the aliphatic double bonds.

15. A composition according to claim 1, wherein the total content of the components (a) and (b) is from 2 to 40 wt.% based on the total composition.

16. A composition according to claim 15, wherein the dispersed phases amount to 2.1 to 80 wt.% of the total composition.

17. A composition according to claim 16, wherein the weight percentage of the component (c) to the sum of (a) and (b) is 5 to 100 wt.% and the weight ratio of (a) to (b) is ¼ to 4/1.

18. A composition according to claim 17, wherein the weight ratio of (a) to (b) is ¼ to 1/1.

19. A composition according to claim 1, further containing an effective amount of stabilizers.

20. A composition according to claim 1, further containing an effective amount of flame-retardants.

21. A composition according to claim 1, further containing an effective amount of stabilizers and a reinforcing amount of glass fibers.

22. A composition according to claim 1, further containing effective amounts of stabilizers and flame-retardants and a reinforcing amount of glass fibers.

* * * * *